3,022,278
VINYLIDENE HALIDE POLYMER SYNTHESIS
John D. Calfee, Dayton, and Lowell E. Erbaugh, Vandalia, Ohio, assignors to Monsanto Chemical Company, St. Louis, Mo., a corporation of Delaware
No Drawing. Filed Apr. 12, 1957, Ser. No. 652,349
12 Claims. (Cl. 260—87.7)

This invention relates to improvements in the art of vinylidene halide polymer synthesis. More particularly, there is provided the method of obtaining a processable vinylidene fluoride polymer which comprises polymerizing a monomeric charge consisting of vinylidene fluoride together with a small amount, e.g., less than about 1.5 weight percent, of an olefinic compound other than vinylidene fluoride, and novel products obtained thereby.

When vinylidene fluoride is homopolymerized in accordance with the methods taught in the prior art, e.g., in U.S. 2,435,537, under a variety of operating conditions, when the conversion is carried to a practicable extent, i.e. above 5%, there is consistently obtained a polymer which is hard and unprocessable. The specific viscosities of 0.1% solutions of these vinylidene fluoride homopolymers in dimethylformamide at 100° C. are high, having values of 0.240 and above. It is known that the best physical properties are obtained when the specific viscosity of a polymer is approximately 0.10 in this test, and that commercially useful polymers almost all fall within the limits of from 0.05 to 0.20. At specific viscosities of above 0.20 the polymer is hard, knotty, and unprocessable, and has poor tensile properties. These vinylidene fluoride homopolymers fit the pattern of being hard and inextensible, molded specimens showing substantially no yield prior to break. The physical properties of orientable polymers such as polyvinylidene fluoride can be improved by quenching, i.e. by shock cooling of molded specimens, thus suppressing crystallite formation and producing amorphous polymer. However, the molding process requires extremely high temperatures and the necessity for quenching to produce polymer of good physical properties introduces an additional step in shaping process. Furthermore, whenever the polymer is held at temperatures which are elevated but below the viscous flow temperature of the polymer, crystallite formation occurs and the polymer becomes hard and brittle. The vinylidene fluoride homopolymers are, for example, unprocessable on hot mill rolls, the temperature of which is ordinarily about 170° C. maximum; while the homopolymer initially begins to soften and be workable in the mill rolls, after one or two passes through the rolls the orienting effect of the processing produces sufficient crystallite formation that the polymer becomes stiff and hard and will no longer flow on the rolls.

Most of the operations for plastics manufacture require that polymers be fused, i.e. heated to the region of viscous flow one or more times during the fabrication process. In injection or extrusion molding, polymers are forced into or through dies under conditions of fluid flow. In the production of sheets and films by calendering or block skiving techniques, the polymer is made homogeneous and worked into a smooth dough with additives such as plasticizers, colorants, stabilizers, processing aids, etc., by processing in a mixer or on mill rolls prior to the forming step. Mixing and milling steps are employed also in the preparation of plastics charges for injection molding and extrusion, to homogenize the polymer and to incorporate additives into it. Feasible processing temperatures as reached in these procedures, requiring that the polymer be worked under conditions of this viscous flow, are limited by the dictates of machine designs; and it is of sufficient importance that polymers be readily processable in conventional plastics processing equipment that superior physical properties are commonly sacrificed to increased processability in the manufacture of commercial polymers. The expense of special techniques, i.e. controlled ultra-high temperatures and afterworking steps to increase physical properties, is justified only in the case that articles fabricated from the polymer command unusually high prices. It is accordingly desirable to provide methods of obtaining polymers which are processable by ordinary plastics fabricating techniques and which avoid the necessity for special equipment and procedures in shaping products therefrom.

In accordance with this invention it has been found that processable vinylidene fluoride polymers are obtained when vinylidene fluoride is polymerized in the presence of very small amounts, on the order of about 1 weight percent based on the vinylidene fluoride, of an olefinic compound, i.e. a compound containing at least one ethylenic, i.e. aliphatic, double bond. By contrast with the hard and brittle vinylidene fluoride homopolymers prepared in accordance with the prior art processes, the presently-obtained polymers are readily processable, e.g. on hot mill rolls at temperatures of 170° C. Molded specimens of the polymer require no quenching step, but are directly obtained as tough and extensible materials exhibiting a marked yield point prior to break in tensile tests, and having high elongation values, whereas the prior art vinylidene fluoride homopolymers, as noted above, have no such properties when molded into standard thickness specimens in the absence of other modifying steps taken to change the physical properties of the polymer.

The copolymerization of vinylidene fluoride with certain olefinic monomers polymerizable therewith, namely, ethylene or halogen-substituted ethylenes, has been proposed hitherto, e.g. in U.S. 2,468,054. However, this patent contemplates only polymers prepared by the introduction of 5% or more of the olefinic comonomer in conjunction with the vinylidene fluoride in the polymerization charge, whereby there are obtained copolymers differing markedly in properties from either the homopolymers of vinylidene fluoride or homopolymers of the respective olefinic monomers. It is ordinarily true that very minor amounts of copolymerizing monomer, i.e. below about 5%, do not appreciably alter the nature of a polymer. Thus, e.g., whereas GRS rubber contains 20% styrene and 80% butadiene, decreasing the percentage of styrene in the polymer down to about 5%, gives products not materially different from rubbers which are the product of polymerization of butadiene alone. Unexpectedly, however, it has now been found that the presence of so little as 0.5% or less of foreign olefinic compounds in the vinylidene fluoride polymerization charge produces a polymer differing markedly from vinylidene fluoride homopolymers in that it is readily processable, whereas vinylidene fluoride homopolymers are not.

In other respects than the processability, the product of the present process appears to have the valuable properties of vinylidene fluoride homopolymers. It gives a tough, strong plastic which has the high density and extremely good thermal stability and chemical inertness characteristic of vinylidene fluoride homopolymers and not obtainable in vinylidene fluoride copolymers. On the other hand, unlike polyvinylidene fluoride, it can be processed in conventional plastics processing equipment without difficulty, and is adapted for incorporation of colorants, fillers, plasticizers, stabilizers, etc. in conventional plastics manufacturing equipment.

The explanation of the present, unexpectedly pronounced and favorable results of the incorporation of very small amounts of olefinic compounds other than vinylidene fluoride in the vinylidene fluoride polymerization charge is not clearly understood. We have found that the olefinic compounds operate to decrease the molecular weight of the polymer obtained; the specific viscosity of the polymers prepared in accordance with the present process is considerably lower than that of vinylidene fluoride homopolymers and is of the order of 0.1, in contrast to values of 0.2 to 0.4 obtained for vinylidene fluoride homopolymers. One measure of suitable amounts of olefinic compounds to use in the invention, is amounts that result in the production of polymers whose specific viscosities, as measured on 0.1% solution of same in dimethylformamide at 100° C., are within the range of 0.03 to 0.125.

Alternatively or additionally, the favorable properties of our polymers may be attributable to the olefinic compounds becoming incorporated in the vinylidene fluoride polymer chain and there interfering with the tendency of this material to become crystalline. The complex of properties summarized as "processability" of a polymer is closely related to the crystallinity. The softening point of a polymer, i.e. the temperature at which the polymer begins to flow, depends on the test by which it is measured. More significant and reproducible values related to the flow temperature of a polymer are the transition temperatures, i.e. temperatures in which there is an abrupt change in the polymer properties, such as tensile strength, impact strength, etc. An amorphous polymer generally but has one such transition temperature, above which the polymer changes abruptly from a relatively firm solid into a viscous liquid. Vinylidene fluoride polymers are orientable, and orientable polymers tend to form crystallites rather than being amorphous. A polymer tending to form crystallites, in contrast to amorphous polymers, as the temperature is raised goes through a stage at which it is elastic and deformable before reaching the more elevated temperature at which the polymer becomes a liquid exhibiting viscous flow. Increased crystallinity generally increases the temperature to which the polymer must be raised to achieve liquid flow, and vinylidene fluoride homopolymers tend to be highly crystalline. The polymers of vinylidene fluoride obtained in accordance with the present process are more processable than polyvinylidene fluoride, and in contrast to polyvinylidene fluoride, flow readily at ordinary processing temperatures, i.e. at below 200° C. It is, accordingly, possible that the present process by introducing foreign monomer units into the polymer chain diminishes the regularity of the polymer, thus sharply diminishing the crystallinity thereof and therefore producing a polymer with diminished resistance to flow. However, the present invention is not predicated upon such an explanation based on the presence of the olefinic compound in the polymer chain; it is to be noted that the heat stability, solvent resistance and other properties of the present polymers are generally comparable to those of the prior art vinylidene fluoride homopolymers, whereas the prior art vinylidene fluoride copolymers, as noted above, do not exhibit these valuable characteristics. Conceivably an altered structure of the resultant polymer accounts for the change in physical properties obtained in accordance with this invention.

In order to define the invention more clearly and exhibit the improvement thereof over the prior art, there are presented the following non-limiting examples.

EXAMPLE 1

This example illustrates what is to be expected in the way of results when vinylidene fluoride is homopolymerized in accordance with the prior art.

In this and the following experiments there were used stainless steel autoclave reactors fitted with a thermowell and adapted to be held in a heater-shaker assembly. In most of the runs there was used an autoclave of 1.5 inches inside diameter and 8 inches inside length with a capacity of 250 ml.; a similar, smaller autoclave was used in other runs. The procedure used was as follows: Prior to each run the autoclave is thoroughly cleaned, sealed and evacuated. If solid catalyst is used, it is placed in the autoclave before sealing. After evacuation is complete, any liquid components of the polymerization charge, such as dissolved catalyst or olefinic compound, where this is a liquid, are drawn into the autoclave. Gaseous olefinic compounds or other gaseous additives are next introduced into the autoclave, after which the autoclave is refrigerated and the vinylidene fluoride is added in the form of a gas. The charged autoclave is then placed in the heater-shaker assembly and connected to a high-pressure water pump through a manifold. The autoclave is heated and pressured simultaneously, to minimize the danger of over-pressuring. The volume of water introduced into the autoclave is adjusted in accordance with the desired pressure, there generally being used about 100 c. of water at 5,000 pounds per square inch (p.s.i.) pressure in the larger autoclave described above, and lesser or greater amounts of water correspondingly at other pressures. When the desired temperature and pressure are reached, automatic contols hold them constant. At the close of the reaction, the heater is turned off and the autoclave allowed to cool for about two hours before opening; thus unreacted monomer can be vented safely.

The results obtained in a series of runs are summarized in Table I:

Table I

| Vinylidene fluoride, grams | Catalyst, mg. | Pressure, p.s.i.[6] | Temp., °C. | Time, hrs. | Conversion, percent | $n_{sp}$ | $d$ | Tensile break | Elongation break | Remarks |
| --- | --- | --- | --- | --- | --- | --- | --- | --- | --- | --- |
| 165 | DEPC,[1] 40 | 10,000 | 55 | 16 | 35 | | 1.75 | | | Embrittled on processing. |
| 100 | DEPC,[1] 2 | 10,000 | 55 | 1 | 30 | | | 5,166 | 36 | Do. |
| 230 | Gamma-ray [2] | 40,000 | 50-100 | 92 | 8 | | | | | |
| 70 | BZP,[3] 5 | 5,000 | 70 | 12 | Trace | | | | | |
| 70 | BZP,[3] 5 | 25,000 | 70 | 2 | Exploded | | | | | |
| 70 | 3%H$_2$O$_2$,[4] 6.5 | 5,000 | 115 | 12 | 34 | Insol. | 1.75 | 5,491 | 17 | Cross-linked? No yield in tensile. |
| 70 | 3%H$_2$O$_2$,[4] 6.5 | 5,000 | 125 | 13 | 11 | Insol. | 1.75 | | | Do. |
| 70 | 3%H$_2$O$_2$,[4] 13.0 | 5,000 | 115 | 12 | 13 | Insol. | 1.75 | | | Do. |
| 70 | PPS,[5] 100 | | 80 | 12 | 42 | 0.207 | 1.76 | 4,907 | 5 | No yield in tensile. |
| 70 | PPS,[5] 50 | 25,000 | 70 | 13 | 46 | .371 | 1.75 | 3,875 | 13 | Do. |
| 70 | PPS,[5] 50 | 15,000 | 70 | 13 | 60 | .384 | 1.75 | 6,626 | 22 | Do. |
| 70 | PPS,[5] 50 | 10,000 | 70 | 12 | 33 | .262 | 1.75 | 5,290 | 15 | Do. |
| 70 | PPS,[5] 50 | 5,000 | 70 | 12 | 63 | .338 | 1.75 | 5,305 | 18 | Do. |
| 70 | PPS,[5] 50 | 2,000 | 70 | 12 | 66 | .270 | 1.75 | 6,123 | 16 | Do. |
| 70 | PPS,[5] 50 | 1,000 | 70 | 12 | 22 | Gel. | 1.75 | 4,968 | 16 | Do. |
| 70 | PPS,[5] 25 | 5,000 | 70 | 12 | 53 | .240 | 1.75 | 4,337 | 7 | Do. |
| 70 | PPS,[5] 13 | 5,000 | 70 | 12 | 33 | .255 | 1.75 | 5,045 | 9 | Do. |

[1] Diethyl peroxycarbonate.
[2] Gamma rays from a radioactive Cobalt-60 1 curie intensity source inserted in the autoclave thermowell.
[3] Benzoyl peroxide.
[4] In this run, 100 mg. of Na$_2$H$_2$P$_2$O$_4$ were added together with the catalyst, to act as a buffer.
[5] Potassium persulfate. In conjunction with this catalyst, there was used as a buffer material sodium acid pyrophosphate, Na$_2$H$_2$P$_2$O$_7$, in amount equal to ½ by weight of the amount of potassium persulfate catalyst used.
[6] P.s.i.: pounds per square inch, gauge.

The above data are indicative of the failure of the prior art procedures to give satisfactory precessable polymers. Only impracticably low yields were obtained with gamma rays or benzoyl peroxide as a catalyst. Acceptable conversions were obtained with diethyl peroxycarbonate, potassium persulfate, and hydrogen peroxide as catalysts, but none of the polymers obtained in these runs were processable when hot-mill-rolled. The high specific viscosities ($n_{sp}$), which throughout this specification were determined on 0.1 weight percent solutions of the polymer in dimethylformamide at 100° C., and the insolubility of these polymers is consonant with high molecular weight; when the pressure in the polymerization chamber is reduced in an effort to decrease the polymer chain length, the yield drops sharply. As anticipated from consideration of the solubility-viscosity behavior of these polymers, test specimens prepared by compression molding exhibits no yield point in tensile tests and correspondingly break at very low elongation; this result is not contradictory to prior art reports of high elongations obtained with vinylidene fluoride homopolymers, for on the introduction of quenching as an extra step in the specimen preparation in the latter case, the physical behavior to be expected in tensile tests is altered. Without quenching, as shown by the above data, compression molded specimens of standard thickness (0.06 inch) are strong but brittle and non-extensible.

EXAMPLE 2

By contrast, readily extensible and processable polymers are prepared in accordance with the process of this invention, as shown by the data in Tables II and II-A.

The procedure used in preparing these polymers was as described in Example 1, with the additional provision that the added olefinic compound, in the amount shown in Table II and Table II-A was introduced into the autoclave with or after the catalyst and prior to the introduction of vinylidene fluoride and pressuring of the bomb. All of the runs reported in Tables II and II-A were made with 70 grams vinylidene fluoride charged, except that 100 grams was used in the 0.5% propylene run, and at a pressure of 5,000 pounds per square inch gauge, except the last four runs in Table II-A which were at 25,000 p.s.i. For comparison, runs made in the absence of olefinic compounds as described in Example 1 are repeated in Table II.

The difference in the polymer produced in the presence and the absence of the added olefinic compounds under otherwise identical conditions is immediately evident from Tables II and II-A. On inclusion of olefinic compounds in the polymerization charge in accordance with this invention, the specific viscosity is at least halved; however, the yield of polymer in the present process need not be sacrificed to obtain a polymer of the desired characteristics. As shown in Tables II and II-A, the polymers of the present invention, in contrast to the hard, inextensible, unprocessable vinylidene fluoride homopolymers prepared in the absence of an olefinic compound, are readily processable on hot mill rolls at 170° C., and molded specimens of the present polymers are found to exhibit yield points and have high ultimate elongations at break. Consistent results are obtained with a variety of olefinic compounds, i.e., ethylene, propylene, styrene, vinyltrimethylsilane, indicating that the process of the invention is surprisingly, independent of the particular olefinic compound utilized.

It is interesting to examine the data of Table II-A.

*Table II*

| Olefinic compound [1] | Weight Percent | Catalyst [2] | Mg. | Temp., °C. | Time, hrs. | Conversion, Percent | $n_{sp}$ | d | Tensile, p.s.i. | | Elongation, Percent | | Remarks |
|---|---|---|---|---|---|---|---|---|---|---|---|---|---|
| | | | | | | | | | Yield | Break | Yield | Break | |
| None | | PPS | 50 | 70 | 12 | 63 | 0.338 | 1.75 | | 5,305 | | 18 | Homopolymer. |
| Et | 0.2 | PPS | 50 | 70 | 12 | | .192 | | | 5,519 | | 12 | Not enough olefin. |
| None | | PPS | 100 | 80 | | 42 | .207 | 1.76 | | 4,907 | | 5 | Homopolymer. |
| Et | 0.4 | PPS | 100 | 80 | 12 | 36 | .084 | 1.75 | 6,502 | 5,146 | 18 | 191 | Processable. |
| Et | 0.6 | PPS | 100 | 80 | 12 | 67 | .091 | 1.75 | 6,239 | 5,855 | 20 | 312 | Do. |
| Et | 0.7 | PPS | 100 | 80 | 12 | 81 | .097 | 1.75 | 6,486 | 6,634 | 31 | 193 | Do. |
| Et | 2.1 | PPS | 50 | 70 | 12 | None | | | | | | | Too much olefin. |
| S | 1.4 | PPS | 100 | 80 | 12 | 53 | .101 | 1.76 | 6,813 | 5,277 | 19 | 118 | Processable. |
| S | 2.8 | PPS | 100 | 80 | 12 | Trace | | | | | | | Too much olefin. |
| VTS | 1.1 | PPS | 100 | 80 | 12 | 38 | .112 | 1.77 | 6,715 | 5,735 | 18 | 162 | Processable. |
| VTS | 2.3 | PPS | 100 | 80 | 12 | Trace | | | | | | | Too much olefin. |
| Pr | 0.5 | PPS | 100 | 80 | 13 | 43 | .122 | 1.75 | 5,795 | 4,521 | 19 | 155 | Processable. |
| Pr | 0.9 | PPS | 100 | 80 | 14 | 7 | .062 | | | | | | Too much olefin for good yield. |
| None | | 3%H₂O₂ | 6,500 | 115 | 12 | 34 | Insol. | | | 5,491 | | 17 | Homopolymer. |
| Et | 0.6 | 3%H₂O₂ | 6,500 | 115 | 13 | Trace | | | | | | | Too much olefin for this catalyst. |

[1] Et is ethylene; S is styrene; VTS is vinyl trimethyl silane; and Pr is propylene.
[2] PPS is potassium persulfate; buffer, sodium acid pyrophosphate, $Na_2H_2P_2O_7$, was used in amount of 50% of the catalyst weight in each of these runs with potassium persulfate as catalyst in the suspension polymerization.

*Table II-A*

| Olefinic compound [1] | Weight Percent | Catalyst [2] | Mg. | Temp., °C. | Time, hrs. | Conversion, Percent | $n_{sp}$ | d | Tensile, p.s.i. | | Elongation, Percent | | Remarks |
|---|---|---|---|---|---|---|---|---|---|---|---|---|---|
| | | | | | | | | | Yield | Break | Yield | Break | |
| Et | 1.0 | PPS | 200 | 80 | 13 | 29 | 0.086 | 1.73 | 5,300 | 3,948 | 12 | 285 | Processable. |
| Et | 3.0 | PPS | 400 | 80 | 16 | 7 | 0.007 | | | | | | Too much olefin. |
| Et | 3.0 | PPS | 800 | 80 | 15 | 9 | 0.029 | | | | | | Do. |
| Et | 3.0 | PPS | 800 | 80 | 12 | 13 | 0.033 | | | | | | Do. |
| Et | 3.0 | PPS | 400 | 80 | 16 | 36 | Insol. | 1.69 | | 3,534 | | 10 | Do. |
| Et | 3.0 | PPS | 200 | 80 | 13 | 30 | Insol. | 1.65 | | 5,416 | | 12 | Do. |
| Et | 3.0 | PPS | 100 | 80 | 14 | 20 | 0.071 | | | | | | Do. |

[1] Et is ethylene.
[2] PPS is potassium persulfate; buffer, sodium acid pyrophosphate, $Na_2H_2P_2O_7$, was used in amount of 50% of the catalyst weight in each of these runs with potassium persulfate as catalyst in the suspension polymerization; exceptions are last three runs, each of which used 400 mg. sodium acid pyrophosphate.

NOTE.—Last four runs at 25,000 p.s.i.; all others at 5,000 p.s.i.

Thus, in comparison with the sixth line of Table II (0.7% ethylene, 100 mg. catalyst), the first run in Table II-A used more ethylene (1.0%), and despite more catalyst (200 mg.) the conversion was much lower; the product, however, showed a tensile yield and marked tensile elongation, and was processable. Increased ethylene (3.0%), again despite more catalyst (400 mg.), in the next run cut the yield to 7% and the polymer was of extremely low molecular weight. Doubling the catalyst did not help appreciably. Then increasing the pressure from 5,000 to 25,000 p.s.i. increased the yield only a little. By then halving the catalyst but not changing the buffer concentration, conversion increased but not polymer quality. Further decrease in catalyst dropped conversion.

It will be noted from the data in Tables II and II–A that in the polymerizing system used, namely, water-soluble catalysts in aqueous systems, there is evidently a marked sensitivity to the concentration of olefinic compound, and that while a minimum of olefinic compound must be present to alter the resultant polymer properties as desired, excess olefinic compound inhibits formation of the polymer. The quantity of olefinic compound operating to inhibit the conversion to polymer naturally varies somewhat with the particular olefinic compound in a given catalyst system, and also varies with the catalyst system. By resorting to oil-soluble catalyst systems, preferably with added organic solvents, there may be utilized percentages of olefinic compounds which inhibit polymer formation in the water-soluble catalyst system. This is demonstrated in Example 3 below.

EXAMPLE 3

The runs set forth in Table II were made as described in Example 1, the catalyst employed being oil-soluble, i.e. more soluble in organic liquids than in water when present in a two-phase organic liquid-water system.

The series of runs with propylene shows that very little, indeed, gives, a polymer of excellent properties—and quite different from vinylidene fluoride homopolymer made in either the presence or absence of xylene. The data also show that the rate of charge of properties is very great for only small increases in propylene content. The run with 1.3% propylene produced a processable polymer, but the yield was very low; the polymer was also softer than desired for most uses. Large amounts of propylene, e.g. 8%, produced only grease.

(propylene homopolymer is about the same), is 0.84. The percentage decrease in density is calculated by subtracting the density of a given polymer from 1.76, and dividing this difference by 0.84 (then of course multiplying by 100 to give percentage). The following relationships are calculated from the data of Table III:

Percent olefin:          Percentage change in density
0.3 ............................................... 6
0.5 ............................................... 10
2.7 ............................................... 40
5.0 ............................................... 45

It is also to be noted that in the runs with propylene in this oil-soluble catalyst system, the yield fell off with increase in propylene content in a manner somewhat similar to the sharp cut-off in yields found in the water-soluble catalyst systems of Example 2.

Finally, it is also desired to point out the much greater effectiveness of propylene in comparison with the same amount of the other olefinic compounds. Thus, the use of propylene constitutes a highly preferred embodiment of the present invention.

It is to be noted that organic solvents, and particularly aromatic non-olefinic hydrocarbons, may alone produce some effect in lowering the specific viscosity of vinylidene fluoride polymers, but equivalent high elongations and good physical properties are not obtained in the absence of added olefinic compounds. Thus, polymerization of 150 grams of vinylidene fluoride in the presence of 15 mg. of di-tert-butyl peroxide in 2.5 grams of xylene at 23–28,000 p.s.i. and 130° C. for 63 hours produces a polymer having a specific viscosity of 0.079, but with a Clash-Berg $T_f$ of 48.8° C., i.e., a high brittle point, and an ultimate elongation at break of only 75%. Similarly, polymerization of 150 grams of vinylidene fluoride in the presence of 1.5 grams of xylene and 1.15 grams of benzene, using 12 mg. of di-tert-butyl peroxide as catalyst, at 24–30,000 p.s.i. and 130° C. for 65 hours, total produces 53 grams of polymer having an ultimate elongation of only 110%. The physical properties of the polymer produced in the presence of olefinic compounds in accordance with this invention are greatly superior, and whether produced in the presence or absence of aromatic non- Table III

| Run | Olefinic compd.[1] | Weight, percent | Xylene, g. | Catalyst, mg.[2] | Time, hrs. | Conversion, percent | $n_{sp}$ | $d$ | Tensile, p.s.i. | | Elongation, percent | | Thermal prop., °C. | | Clash-Berg, °C. | |
|---|---|---|---|---|---|---|---|---|---|---|---|---|---|---|---|---|
| | | | | | | | | | Yield | Break | Yield | Break | S.P. | M.P. | $T_D$ | $T_{2000}$ |
| 451 | Pr | 0.3 | 2.5 | 20 | 14 | 14 | .078 | 1.71 | 4,750 | 4,660 | 10 | 515 | 148 | 160 | 28 | 139 |
| 454 | Pr | 0.5 | 2.8 | 24 | 15 | 15 | .083 | 1.68 | 3,100 | 3,160 | 10 | 600 | 148 | 154 | 1 | 124 |
| 450 | Pr | 1.3 | 2.3 | 18 | 18 | 5 | | | White rubbery polymer was extensible and processable | | | | | | | |
| 449 | Pr | 8.0 | 2.5 | 20 | 15 | 3 | | | Product was an oily grease | | | | | | | |
| 456 | Et | 2.7 | 2.4 | 12 | 15 | 17 | .072 | 1.48 | 3,085 | 4,085 | 10 | 560 | 135 | 144 | −4 | 129 |
| 445 | Et[3] | 5.0 | 2.3 | 14 | 67 | 19 | .074 | 1.43 | 3,070 | 5,150 | 10 | 595 | 120 | 132 | −8 | 120 |

[1] Pr is propylene; and Et is ethylene.
[2] Catalyst was ditertiary-butyl peroxide.
[3] In each run except last, vinylidene fluoride was 150 grams, pressure was 25,000–35,000 p.s.i., temperature was 130° C.; in last run vinylidene fluoride was 160 grams, pressure was 25,000 p.s.i., temperature was 125° C.

The runs in Table III with ethylene demonstrate that 2.7% ethylene produced a polymer very little different from that obtained with 5% ethylene.

In summary, the first increments of foreign olefinic compound added to vinylidene fluoride that is to be polymerized, results in a profound change in the character of the polymer. Increasing small increments up to the neighborhood of 1.5% continue to result in marked changes in polymer properties, but the rate of change is dropping off. Long before 5% olefinic compound is reached, the polymer has become much the same as that obtained with 5% olefinic compound. This can be visualized by considering the densities of the polymers in Table III. The difference between the density of vinylidene fluoride homopolymer, 1.76, and ethylene homopolymer, 0.92 olefinic organic compounds having a modifying effect on the polymerization, are of improved and preferable properties.

The above data clearly illustrate the operation and characteristics of the process of this invention. Homopolymerization of vinylidene fluoride in accordance with the methods taught by the prior art produces polymers which are unprocessable in plastics manufacturing equipment such mill rolls, and which cannot be cold drawn to elongated specimens when compression molded without further specific special treatment to develop cold drawing characteristics. By inclusion of extremely small amounts of foreign olefinic compounds, i.e. other than vinylidene fluoride, in the polymerization charge, processable polymers are obtained which exhibit yield points and high ultimate elongation in tensile tests, i.e., are directly capable of cold drawing when compression molded. The polymers produced in accordance with this invention differ from prior art polymers made by including 5% or more olefinic comonomers in conjunction with vinylidene fluoride in a polymerization reaction in that there is a steep and marked change in properties of the resultant polymer on inclusion of the presently-claimed very small amounts, on the order of 1%, of olefinic compound in the polymerization charge, the polymer obtained being processable in contrast to the vinylidene fluoride homopolymers of the prior art, but otherwise having very valuable properties, such as heat resistance and chemical stability, comparable to those of vinylidene fluoride homopolymers; whereas when copolymers are prepared by including 5% or more of copolymerizing monomer with vinylidene fluoride, the polymer obtained is already very different from the vinylidene fluoride homopolymers of the prior art, being, e.g., subject to deformation at temperatures of about 100° C., and there is no such sharp alteration in the nature of the polymer obtained over a small percentage change in the amount of copolymerizing monomer added. Thus, the present polymers are useful in applications for which neither the vinylidene fluoride homopolymers nor the vinylidene fluoride copolymers of the prior art are suited, e.g., in the preparation of colored articles of superior heat stability, which cannot be prepared from the vinylidene fluoride homopolymers because of inability to process the homopolymers with colorants to produce a homogeneous mix, and cannot be prepared from vinylidene fluoride copolymers with 5% or more comonomer because of inability to attain the excellent resistance to deformation at elevated temperature, as well as the wide useful temperature range, low dimensional change in molding, clarity, high density, good electrical properties, and other valuable characteristics of the present polymers. The effect of minute amounts of olefinic compounds in producing drastic alteration of the resultant polymer properties in accordance with this invention is surprising, and the result of operating in accordance with the present process is of special value in that the polymer obtained is readily processable in conventional plastics manufacturing equipment and thus can readily be compounded with colorants, plasticizers, processing aids and other additives usual in the plastics industry, can be softened and heated in the preparation for molding processes, etc., whereas vinylidene fluoride homopolymers cannot be so processed.

The process of the invention is operated by polymerizing vinylidene fluoride in the presence of an olefinic compound other than vinylidene fluoride in amount sufficient to render the resulting polymer processable and yieldable in the form of otherwise untreated compression molded specimens. The minimum amount of such olefinic compound to affect the properties of the polymer obtained will of course vary somewhat with the particular olefinic compound used and may also vary with the polymerizing conditions employed, such as the catalyst system chosen, etc. Excellent results are obtained when employing 1% or less of olefinic compound by weight in the polymerization system. It has been found that when an aqueous system is used and a water-soluble catalyst is employed, there appears to be a critical maximum limit to the amount of olefinic compound which can be present without inhibiting conversion to polymer almost completely. In oil-soluble catalyst systems, somewhat higher proportions of olefinic compounds can be employed without unduly decreasing conversion, to produce processable polymers. However, other properties change undesirably as the proportion of olefinic compound in vinylidene fluoride is increased. Thus, for example, an undesired rise in melt index, which is another measure of the processability of polymers, has been observed (at otherwise fixed conditions) as the proportion of olefinic compounds in the polymerization charge rises to 3% and above. In the embodiment of this invention which comprises polymerizing vinylidene fluoride in the presence of olefinic compounds in organic solvent-containing systems, using oil-soluble catalysts, though not necessarily in the absence of water, i.e. a system wherein there is present at least some organic compound other than the vinylidene fluoride, olefinic compound and catalyst, and particularly when this organic compound is an aromatic hydrocarbon, it is still desired to maintain the olefinic compound in concentration less than 1.5% even if greater amounts would still permit adequate conversion, because the product made with larger amounts of olefinic compound does differ sufficiently from those of the prior art employing 5% and more comonomer. In aqueous systems, as noted above, the concentration of olefinic compound may be dictated by the exigencies of the situation and has been found effectively limited to about 1.5% or less. Most olefinic compounds can be used in amounts of from 0.05 to 1.5 percent, the preferred range usually being 0.3 to 1.0 percent.

A particularly effective and preferred group of olefinic compounds usable in the present process are mono-olefinic hydrocarbons, and especially olefinic hydrocarbons of less than 10 carbon atoms, e.g., aliphatic olefins such as ethylene, propylene, isobutene, etc., as well as ethylenically unsaturated aromatic hydrocarbons such as styrene, vinyl-toluene, etc.; cycloolefinic hydrocarbons, e.g. cyclopentene, methylcyclohexenes, etc. can be used. Other olefinic compounds of utility in the presence process which are also hydrocarbon in nature include the dienes, e.g., butadiene, isoprene, hexadiene, etc., especially the conjugated dienes. It should be pointed out that non-conjugated polyene compounds, whether or not completely hydrocarbon in nature, i.e. compounds having two or more olefine bonds in non-conjugated relationship, for example divinylbenzene, diallyl maleate. etc., although useful with the broad scope of the invention, are apt to cause some cross-linking and therefore are less preferred except when special properties reflecting such cross-linking are desired in the polymer products. Other classes of olefinic compounds are also contemplated as producing the effect discovered in accordance with this invention, i.e., that minor amounts, on the order of 1%, of olefinic compounds present during vinylidene fluoride polymerization radically improved the processability of the resulting polymers. Thus, e.g., there is contemplated the use of an olefinic acid or derivative thereof, such as acrylic acid, methyl methacrylate or acrylonitrile, as well as related halogenated compounds such as α-chloracrylonitrile or α-fluoracrylonitrile. Halogenated olefins such as vinylidene chloride or vinyl chloride may be employed, or even fluorinated hydrocarbons more closely related to vinylidene fluoride and having a less pronounced difference therefrom, e.g. vinyl fluoride. Other classes of olefinic compounds that may be introduced into the vinylidene fluoride polymerization to affect the properties of resultant polymers include vinyl-heterocyclics such as vinyl carbazole, vinyl ethers such as vinyl ethyl ether, vinyl esters such as vinyl acetate, allyl compounds such as allyl alcohol, etc. It is to be appreciated that there may also be employed to produce the results obtained by this invention olefinic compounds wherein a vinyl or other ethylenically unsaturated radical is attached to atoms less usually encountered in organic compounds than are present in the above-listed compounds, such as vinyl phosphonates, e.g. bis-(chloroethyl) vinylphosphonate, or vinyl silane compounds, e.g. vinyltrimethylsilane, vinyltriphenylsilane, etc.

The conditions under which the polymerization is conducted should be the conditions known to be effective for the polymerization of vinylidene fluoride, i.e. superatmospheric pressure and in the presence of polymerization catalysts. Advantageously, pressures of at least 1000 pounds per square inch (p.s.i.) are employed, and preferably from 5,000 to 25,000 p.s.i. for maximum yield in minimum time, but it is to be appreciated that the present polymerization reaction is also operable at pressures as low as 30 atmospheres with active catalyst systems, the polymerization time being extended accordingly. For that matter, there is no objection to effecting the polymerization at pressures as low as atmospheric and below, so long as a sufficiently active catalyst is used to avoid inordinately long reaction periods. The temperature chosen should be sufficiently high to activate the catalyst system chosen and not so high as to produce carbonization of the polymer. Generally the preferred temperature range is from about room temperature, i.e. 20° C., up to, say, 250° C., depending upon the reactor geometry and other factors, with 50 to 150° C. being most common. The higher temperature ranges may be used conveniently in continuous processes wherein provision is made to remove polymer relatively rapidly from the heated polymerization zone. In batch reactors, temperatures of 50 to 150° C. are generally found preferable. The dwell time, i.e. the time during which the monomeric charge need be held under polymerization conditions to produce polymer, as is well understood, varies from seconds to days depending on the catalyst, pressure, and temperature, and is adjusted accordingly. Other things being equal, extension of the dwell time produces higher conversion of the vinylidene fluoride monomer, and continuous flow systems permit use of shorter dwell times to produce a given conversion than do batch systems.

A variety of catalysts are effective for initiating the polymerization. Satisfactory results can be obtained by polymerization initiators such as ionizing radiation, e.g. neutrons, or gamma rays derived from such sources as cobalt-60, tantalum-285, or spent fuel elements from nuclear reactors, although such radiation-catalyzed systems generally require extended periods of reaction to produce satisfactory yields. It is not outside the broad scope of the invention to employ such polymerization catalysts as organo-metallic compounds, e.g. lithium butyl; hydrazine salts, e.g. hydrazine hydrates; amine oxides, e.g. trimethylamine oxide; azo compounds, such as diazodiisobutyronitrile, etc. Peroxy compounds are, however, among the most useful catalysts for the polymerization of vinylidene fluoride. Exemplary of useful inorganic peroxy compounds active as catalysts for vinylidene fluoride polymerization are oxygen, hydrogen peroxide, potassium persulfate, potassium percarbonate, sodium perborate, etc. Organic peroxy compounds such as dibenzoyl peroxide, tertiary-butyl hydroperoxide and diethyl peroxycarbonate are also effective. The catalyst is employed in polymerization initiating amount, i.e. when a catalyst other than exciting radiation is employed, it is present generally in the range of from 0.005% to 5% by weight of vinylidene fluoride, the range of 0.05% to 0.5% being preferred. As recognized in polymer technology, catalyst residues, particularly of peroxy compounds, may be incorporated in the resulting polymer, and additional catalyst must be added from time to time in continuous systems in order to maintain the polymerization. While oxygen acts as a catalyst for the present polymerization, it may act as an inhibitor if a peroxide catalyst is employed. Therefore, to maintain control of the polymerization conditions, oxygen is preferably excluded from the polymerization chamber except to the extent it is deliberately added as a catalyst. For this reason de-oxygenated water is advantageously used when water is present in the polymerization system.

Either oil-soluble or water-soluble catalysts can be used, and either in the presence or absence of water and in the presence or absence of added organic solvents. Naturally, when water is not present the catalyst used should be oil-soluble, i.e. capable of dissolving in the organic reaction mixture, at least to a limited extent, and preferably readily soluble therein. Where applicable, catalysts can be classed as water-soluble or oil-soluble depending on their distribution coefficients in the presence of a liquid aqueous phase plus a liquid organic phase. Examples of catalysts classed as oil-soluble are benzoyl peroxide, cumene hydroperoxide, di-tertiary-butyl peroxide. Examples of those classed as water soluble are potassium persulfate and hydrogen peroxide.

It is frequently helpful to use buffers or promoters with the present catalysts and especially the water-soluble catalysts in aqueous systems. One such class of promoters are oxidizable, i.e. reducing compounds, and particularly the sulfoxy compounds such as sodium bisulfite, potassium sulfite or hydrosulfite, potassium thiosulfate, sodium sulfoxalate, sodium sulfide, etc. Buffers regulate the pH of aqueous polymerization systems and assist to control the reaction; exemplary of useful compounds of this class are borax, sodium acid pyrophosphate, etc. Dispersing agents such as soaps, sulfated alcohols, etc., e.g. sodium lauryl sulfate, are to be used with caution, since they may have a pronounced effect in lowering conversion and polymer molecular weight.

A liquid polymerization medium, while not essential, is beneficial in facilitating the agitation of the monomer phase, acting as heat transfer agent, and assisting in the control of the reaction temperature. Water is particularly preferred since is it generally the best heat transfer agent and least active in lowering the polymer molecular weight. To exclude the polymerization-initiating effects of uncontrolled amounts of oxygen in the polymerization reaction, deoxygenated water is preferably employed. As noted above, even minor amounts of organic solvent present, e.g., as a catalyst solvent, may affect the polymer properties, though if the amount of organic solvent is maintained low, e.g., below 5% and preferably below 2% to 3% by weight based on the vinylidene fluoride, it does not mask the effect of the olefinic compound on the polymer properties. Alkylbenzenes such as toluene, xylene, cumene, etc. have the most pronounced effect on polymer properties, while aromatic compounds such as benzene and chlorinated aromatic compounds such as chlorobenzene generally have some effect thereon. The organic solvents are particularly useful when it is desired to employ organic-soluble catalyst and/or to introduce olefinic compounds which are otherwise unusable in the process of the invention, for example, because they unduly depress the polymer conversion in an aqueous suspension system.

As is usual in polymer synthesis under pressure, it is desirable to provide means to insure good distribution of catalyst through the polymer mass. This is particularly readily effected when a liquid reaction medium such as water is used. In addition to stirring devices, the reactor is desirably equipped with means for recording and controlling the internal temperature and pressure, and with safety rupture discs, etc.

The apparatus must be constructed of a material such as steel which can be fabricated in a form capable of standing any pressure used, but the polymerization chamber itself is preferably lined with an inert material resistant to corrosion such as stainless steel, silver, nickel, tantalum, platinum, rhodium, chromium, porcelain, or enamel, which will not adversely affect the rate of polymerization or the quality of the product.

The polymerization process is attended by a drop in pressure; the pressure may be maintained in the desired range by continuous or intermittent injection of additional quantities of vinylidene fluoride as well, if desired, of the added olefinic compounds. It is to be understood that the polymerization can be carried out batchwise or in continuous types of processes.

The polymeric product obtained from the reactor in solid form may, if desired, be washed with water or other solvents to remove catalyst residues, etc. The polymer obtained is of excellent toughness and high heat-stability and is particularly adapted for processing in plastic manufacturing processes such as blending in a mixer or on hot mill rolls. For example, it can be mixed without difficulty and in conventional plastics processing equipment with pigments or dyes, plasticizers or other softeners, fillers, other resins, rubbers, etc. The polymer is adapted for production of films and fibers by extrusion techniques at temperatures ordinarily used in the plastics industry for film production; an orienting, i.e. stretching, step can be used in such a forming operation to increase the strength of the shaped article, but a quenching step prior to the orientation is not necessary to confer yielding, i.e. cold drawing properties thereon. The present polymer is further suited, in contrast to the prior art polyvinylidene fluoride, to formation into sheet and films by calendering processes on mill rolls. It will be appreciated that the polymer of this invention is also suited for the production of useful articles by processes such as solvent casting or by injection or compression molding techniques. The present polymers have generally approximately the same solubility as polyvinylidene fluoride, i.e. they are soluble in the more active solvents such as dimethylformamide and dimethylacetamide, but resistant to the swelling and dissolving action of less active solvents, e.g. aliphatic hydrocarbons such as hexane. The polymers of the invention may also be utilized as a coating for fabrics, leather, cellulose products, etc.

As in all chemical processes, most of the variables are interrelated to some extent. Thus, the particular olefinic compound and its amount, the particular catalyst and its amount, the presence or absence of water, organic solvents, and the like, the pressure, temperature and time, all affect the results. Those skilled in the art, having been given the benefit of the present disclosure, will readily correlate these variables to obtain vinylidene fluoride polymers of improved and desired properties.

Thus, while the invention has been described with reference to various particular modes of operating and individual compounds which may be employed, it will be appreciated that variations and modifications are usable without departure from the invention.

What is claimed is:
1. The process which comprises catalytically polymerizing vinylidene fluoride with a free radical catalyst in contact with a mono-olefinic compound selected from the group consisting of ethylene, propylene, styrene, and vinyltrimethylsilane, said mono-olefinic compound being present in an amount of less than about 1.5% by weight but at least 0.05% by weight and sufficient to render the resultant polymer readily processable and of specific viscosity of 0.03 to 0.125 determined as a 0.1% solution in dimethylformamide at 100° C.

2. The process of claim 1 wherein said mono-olefinic compound is propylene.

3. The process of claim 1 wherein said mono-olefinic compound is ethylene.

4. The process of claim 1 wherein said mono-olefinic compound is styrene.

5. The process of claim 1 wherein said mono-olefinic compound is vinyltrimethylsilane.

6. The process of claim 1 wherein said polymerization is conducted in the presence of an aromatic hydrocarbon compound free of aliphatic unsaturation as a liquid solvent.

7. The process of claim 1 wherein said polymerization is conducted in the presence of water and a water-soluble peroxy compound as a polymerization catalyst, and in the absence of an aromatic compound.

8. A thermoplastic copolymer having a specific viscosity of from 0.03 to 0.125 as a 0.1% solution in dimethylformamide at 100° C., said copolymer being a copolymer of vinylidene fluoride and from 0.05 weght percent to 1.5 weight percent of a mono-olefinic compound selected from the group consisting of ethylene, propylene, styrene, and vinyltrimethylsilane, based on the amount of vinylidene fluoride present, as substantially the sole monomeric constituents.

9. A thermoplastic copolymer having a specific viscosity of from 0.03 to 0.125 as a 0.1% solution in dimethylformamide at 100° C., said copolymer comprising vinylidene fluoride and from 0.05 wt. percent to 1.5 wt. percent of propylene, based on the amount of vinylidene fluoride present, as substantially the sole monomeric constituents.

10. A thermoplastic copolymer having a specific viscosity of from 0.03 to 0.125 as a 0.1% solution in dimethylformamide at 100° C., said copolymer comprising vinylidene fluoride and from 0.05 wt. percent to 1.5 wt. percent of ethylene, based on the amount of vinylidene fluoride present, as substantially the sole monomeric constituents.

11. The thermoplastic copolymer of claim 8 wherein said mono-olefinic compound is styrene.

12. The thermoplastic copolymer of claim 8 wherein said mono-olefinic compound is vinyltrimethylsilane.

References Cited in the file of this patent

UNITED STATES PATENTS

| | | |
|---|---|---|
| 2,468,054 | Ford | Apr. 26, 1949 |
| 2,479,367 | Joyce et al. | Aug. 16, 1949 |
| 2,496,384 | De Nie | Feb. 7, 1950 |
| 2,547,815 | De Nie | Apr. 3, 1951 |
| 2,738,343 | Dittman et al. | Mar. 13, 1956 |
| 2,919,263 | Kahrs et al. | Dec. 29, 1959 |

OTHER REFERENCES

Doolittle: The Technology of Paints and Plasticizers, Wiley, New York, 1954, page 454.